2,981,742
LOWER ALKYL Δ⁵-3-ACYLOXY-7-BROMO-BISNORCHOLENATES

John M. Chemerda and William V. Ruyle, Metuchen, and Earl M. Chamberlin, Westfield, N.J., assignors to Merck & Co., Inc., Rahway, N.J., a corporation of New Jersey No Drawing. Filed Mar. 8, 1951, Ser. No. 214,638

3 Claims. (Cl. 260—397.1)

This invention is concerned generally with novel steroid compounds and with processes for preparing them. More particularly, it relates to a novel process generally applicable for the conversion of $\Delta^5$-3-acyloxy-etiocholene compounds, having an oxygen-containing organic side chain attached to the cyclopentano ring of the steroid nucleus, to the corresponding $\Delta^{5,7,9}$-3-acyloxy-etiocholatriene compound, and to the intermediate and final products obtained utilizing this novel procedure. The $\Delta^{5,7,9}$-3-acyloxy-etiocholatriene compounds thus obtained are valuable as intermediates in the preparation of 11-oxygenated steroid compounds, such as cortisone and Kendall's Compound F (17-hydroxy-corticosterone).

Adrenal hormones such as cortisone are presently manufactured utilizing a partial synthetic method starting with the bile acid, cholic acid. In view of the relative scarcity of cholic acid, however, the total output of adrenal hormone from this source is necessarily limited. In contrast to the scarcity of the bile acids, various steroid compounds such as cholesterol, stigmasterol, diosgenin, and the like are plentiful, and it was known heretofore that $\Delta^5$-3-hydroxybisnorcholenic acid and $\Delta^5$-3-hydroxy-20-keto-pregnene could be prepared from cholesterol and stigmasterol. There were thus previously available, in relatively abundant supply, various $\Delta^5$-3-hydroxy-etiocholene compounds having an oxygen-containing organic side-chain attached to the 17-carbon atom, such as $\Delta^5$-3-hydroxy-bisnorcholenic acid, $\Delta^5$-3-hydroxy-20-keto-pregnene, diosgenin, and the like. No methods existed heretofore for converting these $\Delta^5$-3-hydroxy-etiocholene compounds to the pharmacologically important 11-oxygenated steroids. The object of the present invention, therefore, was to prepare intermediates which would permit the introduction of substituents into the 11-position of the steroid molecule.

We have now discovered that these intermediates can be prepared starting with the readily available $\Delta^5$-3-hydroxy-etiocholene compounds, having an oxygen-containing organic side-chain attached to the 17-carbon atom, by a novel procedure which is conducted as follows: the $\Delta^5$-3-hydroxy-etiocholene compound having an oxygen-containing organic side-chain attached to the 17-carbon atom (Compound 1 hereinbelow) is reacted with an acylating agent thereby producing the corresponding $\Delta^5$-3-acyloxy-etiocholene compound (Compound 2) which is then reacted with N-bromosuccinimide to form the corresponding $\Delta^5$-3-acyloxy - 7 - bromo-etiocholene compound (Compound 3). The latter compound is then reacted with a tertiary amine thereby removing the elements of hydrogen bromide from the molecule to produce the $\Delta^{5,7}$-3-acyloxy-etiocholadiene compound (Compound 4) which, in turn, is reacted with mercuric acetate in solution in an organic solvent to produce the corresponding $\Delta^{5,7,9}$ - 3 - acyloxy-etiocholatriene compound wherein the oxygen-containing organic side chain attached to the 17-carbon atom is unchanged from that present in the $\Delta^5$-3-acyloxy-etiocholene starting material (Compound 5).

The reactions indicated hereinabove may be chemically represented as follows:

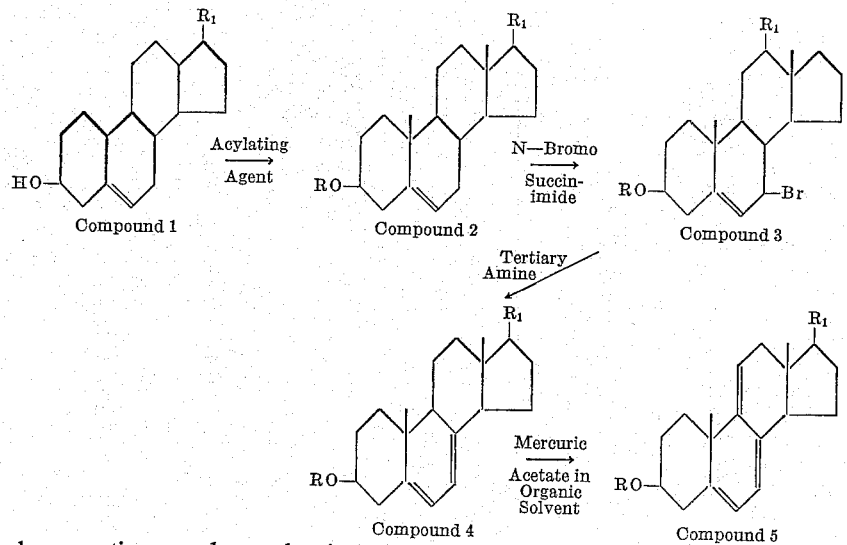

wherein R is an acyl radical, and $R_1$ is an oxygen-containing organic side chain.

In carrying out our novel process the $\Delta^5$-3-hydroxy-etiocholene compound having an oxygen-containing organic side chain attached to the 17-carbon atom, such as $\Delta^5$-3-hydroxy-bisnorcholenic acid, $\Delta^5$-3-hydroxy-20-keto-pregnene, diosgenin, and the like is reacted with an acylating agent, as for example an acyl anhydride, an acyl halide, and the like, preferably benzoyl chloride or an alkanoic anhydride such as acetic anhydride, propionic anhydride and the like. The acylation reaction is ordinarily conducted in the presence of an alkaline material such as a tertiary amine, thereby producing the corresponding $\Delta^5$-3-acyloxy-etiocholene compound having an oxygen-containing organic side chain attached to the 17-carbon atom, such as $\Delta^5$-3-acyloxy-bisnorcholenic acid, $\Delta^5$-3-acyloxy-20-keto-pregnene, diosgenin 3-acylate and the like. Where the oxygen-containing organic side chain in the 17-position contains a hydroxy or carboxy radical, this is also converted to the corresponding ester grouping; e.g. $\Delta^5$-3-acyloxy-bisnorcholenic acid is reacted with an esterifying agent, preferably a lower alkanol in the presence of a mineral acid to produce the corresponding alkyl $\Delta^5$-3-acyloxy-bisnorcholenate.

This $\Delta^5$-3-acyloxy-etiocholene compound is then reacted with N-bromosuccinimide thereby replacing the hydrogen attached to the carbon atom in the 7-position by a bromo radical. The reaction between the $\Delta^5$-3-acyloxy-etiocholene compound and the N-bromosuccinimide is preferably carried out by heating the reactants together in an organic solvent such as carbon tetrachloride while exposing the reactants to intense illumination. The reaction is conveniently carried out by heating the reactants in boiling carbon tetrachloride while illuminating with one or more photo-flood light bulbs. The resulting $\Delta^5$-3-acyloxy - 7 - bromo-etiocholene compound having an oxygen-containing organic side chain attached to the 17-carbon atom as, for example, an alkyl $\Delta^5$-3-acyloxy-7-bromo-bisnorcholenate such as methyl $\Delta^5$-3-acetoxy-7-bromo-bisnorcholenate, methyl $\Delta^5$-3-benzoxy-7-bromo-bisnorcholenate, and the like, a $\Delta^5$-3-acyloxy-7-bromo-20-keto-pregnene compound, such as $\Delta^5$-3-benzoxy-7-bromo-20 - keto-pregnene, $\Delta^5$- 3 - alkanoxy - 7 - bromo-20-keto-pregnene, $\Delta^5$-3-acetoxy-7-bromo-20-keto-pregnene, and the like, a 7-bromo-diosgenin-3-acylate such as 7-bromo-diosgenin-3-acetate, 7-bromo-diosgenin-3-benzoate, and the like. The $\Delta^5$-3-acyloxy-7-bromo-etiocholene compound is conveniently isolated by filtering the reaction mixture, evaporating the organic solvent therefrom and digesting the residual material with an organic solvent such as acetone, whereupon the desired product ordinarily crystallizes and can be recovered by filtration.

The $\Delta^5$-3-acyloxy-7-bromo-etiocholene compound, having an oxygen-containing organic side chain attached to the 17-carbon atom, is then reacted with a tertiary amine to produce the corresponding $\Delta^{5,7}$-3-acyloxy-etiocholadiene compound having an oxygen-containing organic side chain attached to the 17-carbon atom, as for example an alkyl $\Delta^{5,7}$-3-acyloxy-bisnorcholadienate, such as alkyl $\Delta^{5,7}$-3-alkanoxy-bisnorcholadienate, methyl $\Delta^{5,7}$-3-acetoxy-bisnorcholadienate, methyl $\Delta^{5,7}$-3-benzoxy-bisnorcholadienate, a $\Delta^{5,7}$-3-acyloxy-20-keto-pregnadiene such as $\Delta^{5,7}$ - 3 - alkanoxy - 20 - keto - pregnadiene, $\Delta^{5,7}$ - 3 - acetoxy - 20 - keto - pregnadiene, $\Delta^{5,7}$ - 3 - benzoxy - 20 - keto-pregnadient, a 7-dehydro-diosgenin - 3 - acylate, such as 7-dehydro-diosgenin-3-alkanoate, 7-dehydro-diosgenin-3-acetate, 7-dehydro-diosgenin-3-benzoate, and the like. The reaction between the $\Delta^5$-3-acyloxy-7-bromo-etiocholene compound and the tertiary amine is preferably carried out by heating the reactants together in an organic solvent such as xylene, and preferably under a nitrogen atmosphere. Various tertiary amines can be employed, such as collidine, dimethyl aniline, and the like. The $\Delta^{5,7}$-3-acyloxy-etiocholadiene is conveniently recovered from the reaction mixture by shaking the mixture with water to dissolve the by-product tertiary amine hydrobromide, then with aqueous hydrochloric acid thereby removing excess tertiary amines from the reaction mixture, then with a dilute aqueous alkaline solution such as aqueous sodium bicarbonate, and finally with water. The organic extract is then dried and evaporated to dryness to give the desired product which is conveniently purified by digestion followed by recrystallization from an organic solvent such as acetone.

The $\Delta^{5,7}$-3-acyloxy-etiocholadiene compound is then reacted with mercuric acetate in solution in an organic solvent to produce the corresponding $\Delta^{5,7,9}$-3-acyloxy-etiocholatriene compound, having an oxygen-containing organic side chain attached to the 17-carbon atom. The organic solvent utilized in the reaction is preferably a mixture of chloroform and acetic acid and the reaction is conveniently carried out at temperatures between 0° C. and 30° C. Where the starting material utilized in this reaction with mercuric acetate is an alkyl $\Delta^{5,7}$-3-acyloxy-bisnorcholadienate, the product is the corresponding $\Delta^{5,7,9}$-3-acyloxy-bisnorcholatrienate, such as alkyl $\Delta^{5,7,9}$-3-alkanoxy-bisnorcholatrienate, methyl $\Delta^{5,7,9}$-3-acetoxy-bisnorcholatrienate, methyl $\Delta^{5,7,9}$-3-benzoxy-bisnorcholatrienate, and the like. Where the starting material is a $\Delta^{5,7}$-3-acyloxy-20-keto-pregnadiene, the product is the corresponding $\Delta^{5,7,9}$-3-acyloxy-20-keto-pregnatriene such as $\Delta^{5,7,9}$-3-alkanoxy-20-keto-pregnatriene, $\Delta^{5,7,9}$-3-acetoxy-20-keto-pregnatriene, $\Delta^{5,7,9}$-3-benzoxy-pregnatriene, and the like. Where the starting material is a 7-dehydro-diosgenin-3-acylate, the product is the corresponding 7,9-dehydro-diosgenin - 3 - acylate, such as 7,9-dehydro-diosgenin-3-alkanoate, 7,9-dehydro-diosgenin - 3 - acetate, 7,9-dehydro-diosgenin-3-benzoate and the like.

If desired, the $\Delta^{5,7}$-3-acyloxy-etiocholadiene compound having an oxygen-containing organic side chain attached to the 17-carbon atom can be hydrolyzed to the corresponding $\Delta^{5,7}$-3-hydroxy-etiocholadiene compound prior to the reaction with mercuric acetate. When this $\Delta^{5,7}$-3-hydroxy-etiocholadiene compound is reacted with mercuric acetate, the product obtained is the corresponding $\Delta^{5,7,9}$ - 3 - hydroxy - etiocholatriene compound having an oxygen-containing organic side chain attached to the 17-carbon atom. Where, however, the oxygen-containing organic side chain attached to the 17-carbon atom of the $\Delta^5$-3-hydroxy-etiocholene compound contains a carboxylic ester grouping, it is advantageous to retain the ester grouping in this organic radical. Thus, in the case of the substituted $\Delta^{5,7}$-bisnorcholadienic acid compound, it is ordinarily preferred to retain the ester grouping in the side chain and to conduct the reaction with mercuric acetate utilizing the corresponding alkyl $\Delta^{5,7}$-3-hydroxy-bisnorcholadienates. These compounds are readily prepared starting with the corresponding alkyl $\Delta^{5,7}$-3-acyloxy-bisnorcholadienate by reacting the latter compound with a mildly alkaline hydrolyzing agent such as methanolic potassium hydroxide. Thus these $\Delta^{5,7}$-3-hydroxy-etiocholadiene compounds having an oxygen containing organic side chain attached to the 17-carbon atom, as for example an alkyl $\Delta^{5,7}$-3-hydroxy-bisnorcholadienate such as methyl $\Delta^{5,7}$-3-hydroxy-bisnorcholadienate, $\Delta^{5,7}$-3-hydroxy-20-keto-pregnadiene, 7-dehydro-diosgenin, and the like, can be reacted with mercuric acetate, preferably in solution in an organic solvent such as chloroform and acetic acid, to produce the corresponding $\Delta^{5,7,9}$-3-hydroxy-etiocholatriene compound having an oxygen-containing organic side chain attached to the 17-carbon atom, as for example, an alkyl $\Delta^{5,7,9}$-3-hydroxy-bisnorcholatrienate such as methyl $\Delta^{5,7,9}$ - 3 - hydroxy - bisnorcholatrienate, $\Delta^{5,7,9}$-3-hydroxy-pregnatriene, 7,9-dehydro-diosgenin, and the like.

The following examples illustrate methods of carrying out the present invention, but it is to be understood that these examples are given for purposes of illustration and not of limitation.

*Example 1*

A mixture of 23.8 g. of $\Delta^5$-3-acetoxy-bisnorcholenic acid and 1120 cc. of methanol containing 12 cc. of concentrated sulfuric acid was heated under reflux for a period of 18 hours. The clear reaction solution was neutralized by the addition thereto of a solution containing 14.5 g. of potassium hydroxide dissolved in 300 cc. of methanol, and the neutral solution was then evaporated in vacuo to small volume. Fifteen hundred cubic centimeters of water were added to the concentrate, and the product thus precipitated was recovered by filtration and dried to produce crude methyl $\Delta^5$-3-hydroxy-bisnorcholenate. The dry product (dried as thoroughly as possible) was dissolved in 800 cc. of benzene, and 400 cc. of benzene was distilled from the solution thereby removing any residual water remaining in the solution. The resulting benzene solution was then cooled to room temperature and 8 cc. of pyridine was added thereto, followed by 8 cc. of benzoyl chloride. The resulting solution was allowed to stand at room temperature for a period of approximately twelve hours. The reaction mixture was washed with sufficient 5 N hydrochloric acid to remove excess pyridine, then with aqueous sodium bicarbonate. The dried benzene solution was concentrated and the residue was triturated with methanol and the material which separated was recovered by filtration and dried to produce crude methyl $\Delta^5$-3-benzoxy-bisnorcholenate in a yield of approximately 82% of theory. This crude product was purified by recrystallization from acetone to give substantially pure methyl $\Delta^5$-3-benzoxy-bisnorcholenate; M.P. 190–191° C. Anal. Calc'd for $C_{30}H_{40}O_4$: C, 77.56; H, 8.69; Found: C, 77.66; H, 8.48.

*Example 2*

A solution containing 50.9 g. of methyl $\Delta^5$-3-benzoxy-bisnorcholenate dissolved in 650 cc. of carbon tetrachloride was distilled until 100 cc. of carbon tetrachloride had been removed from the solution. Nitrogen gas was flushed through the system, the solution was cooled a few degrees below the boiling point, and 21.4 g. of N-bromosuccinimide was added to the solution. The resulting mixture was illuminated with two photoflood lamps (No. RFL-2 manufactured by General Electric Co.) and, after two minutes, a vigorous reaction occurred. The reaction mixture was illuminated with the photoflood lamps for an additional six-minute period and, at the end of this time, all of the N-bromosuccinimide had reacted. The reaction mixture was then cooled, and the carbon tetrachloride solution was filtered and the filtrate evaporated to dryness. The residual material was digested with acetone, and the insoluble material was recovered by filtration and dried to give 43.5 g. of methyl $\Delta^5$-3-benzoxy-7-bromo-bisnorcholenate; M.P. 140–141° C.; yield approximately 73% of theory. This product was further purified by recrystallization from acetone to give substantially pure methyl $\Delta^5$-3-benzoxy-7-bromo-bisnorcholenate; M.P. 144–145° C.; $[\alpha]_D^{22°} = -166°$ (1% in chloroform). Anal. Calc'd for $C_{30}H_{39}O_4Br$: C, 66.29; H, 7.23; Br, 14.70; Found: C, 66.27; H, 7.15; Br, 14.27.

*Example 3*

22.9 Grams of methyl $\Delta^5$-3-benzoxy-7-bromo-bisnorcholenate was dissolved in 300 cc. of xylene at a temperature of 80° C., and 23 cc. of gamma-collidine (2,4,6-trimethyl-pyridine) were added to the solution. The resulting mixture was heated under reflux and under a nitrogen atmosphere for a period of 20 minutes, and the reaction mixture, containing collidine hydrobromide suspended in the xylene solution of the dehydrobrominated product, was cooled to 0° C. The cooled mixture was washed successively with 250 cc. of ice water, with 250 cc. of ice-cold 1N aqueous hydrochloric acid, with 100 cc. of cold saturated aqueous sodium bicarbonate solution, and finally with ice water. The xylene layer was dried, and the xylene evaporated therefrom under reduced pressure. The residual material was digested with acetone, and the crystalline material was separated by filtration and dried to give 11.4 g. of methyl $\Delta^{5,7}$-3-benzoxybisnorcholadienate; M.P. 170–177° C.; yield approximately 58% of theory; assay of this material indicated it to be 85% pure.

This material was recrystallized repeatedly from acetone and methanol to give substantially pure methyl $\Delta^{5,7}$-3-benzoxybisnorcholadienate; M.P. 189–192° C.; $[\alpha]_D^{22°} = -66.6°$ (1% in chloroform); the identity of the product was further confirmed by the absorption spectrum;

λ max. 2710A ($E_{1\,cm.}^{1\%}$ 297); λ max. 2810A ($E_{1\,cm.}^{1\%}$ 310); λ max. 2930A ($E_{1\,cm.}^{1\%}$ 157)

Anal. Calc'd for $C_{30}H_{38}O_4$: C, 77.88; H, 8.28; Found: C, 78.02; H, 8.25.

The methyl $\Delta^{5,7}$-3-benzoxy-bisnorcholadienate was saponified by heating under reflux for a period of about one hour with a 2% solution of potassium hydroxide in methanol. The saponification mixture was cooled, and the product which crystallized was recovered by filtration and purified by recrystallization from methanol to give substantially pure methyl $\Delta^{5,7}$-3-hydroxy-bisnorcholadienate; M.P. 167–169° C.; $[\alpha]_D^{22°} -130 \pm 2°$ (1% in chloroform). Absorption spectrum;

λ max. 2710A ($E_{1\,cm.}^{1\%}$ 304); λ max. 2810A ($E_{1\,cm.}^{1\%}$ 317); λ max. 2930A ($E_{1\,cm.}^{1\%}$ 179)

Anal. Calc'd for $C_{23}H_{34}O_3$: C, 77.05; H, 9.56; Found: C, 77.20; H, 9.33.

The foregoing 3-hydroxy derivative was reacted with acetic anhydride and pyridine, and the product thus formed was isolated and dried to give methyl $\Delta^{5,7}$-3-acetoxy-bisnorcholadienate; M.P. 147–152° C.

*Example 4*

12.75 Grams of methyl $\Delta^5$-3-acetoxy-bisnorcholenate was dissolved in 300 cc. of a purified low-boiling petroleum fraction (Skellysolve B), and the resulting solution was distilled until 50 cc. of solvent had been removed. 6.2 Grams of N-bromosuccinimide was added to the resulting solution, and the mixture was illuminated for a fifteen-minute period with a photo-flood lamp, (No. 4A manufactured by General Electric Co.), at the end of which time all of the N-bromosuccinimide had reacted. The reaction mixture was cooled and filtered, and the resulting solution was evaporated to small volume and cooled in a dry ice-acetone bath. The product which crystallized was filtered and dried to give 8.97 g. of crude methyl $\Delta^5$-3-acetoxy-7-bromo-bisnorcholenate; M.P. 114–120° C. This product was purified by recrystallization from petroleum ether (Skellysolve B) to give substantially pure methyl $\Delta^5$-3-acetoxy-7-bromo-bisnorcholenate; M.P. 119–120° C. $[\alpha]_D^{22°} -219°$ (1% in chloroform). Anal. Calc'd for $C_{25}H_{37}O_4Br$: C, 62.36; H, 7.75; Br, 16.60; Found: C, 62.37; H, 7.56; Br, 16.66.

*Example 5*

Crude methyl $\Delta^5$-acetoxy-7-bromo-bisnorcholenate was heated under reflux with approximately an equal weight of gamma-collidine in approximately 5 volumes of xylene for a period of approximately 20 minutes. The reaction mixture, containing suspended collidine hydrobromide was cooled to 0° C. and washed successively with ice water, with ice cold 1N aqueous hydrochloric acid, with cold saturated sodium bicarbonate solution, and finally with ice water. The xylene layer was then dried and evaporated to small volume under reduced pressure. The resulting solution was digested with acetone, and the crystalline material which separated was recovered by filtration. It was found to be a mixture of methyl $\Delta^{5,7}$-3-acetoxy-bisnorcholadienate and methyl $\Delta^{4,6}$-3-acetoxy-bisnorcholadienate, as indicated by the absorption spectrum. Attempts to separate the components of the mixture by recrystallization were not satisfactory. The mixture was therefore subjected to chromatography, utilizing activated alumina, whereby pure methyl $\Delta^{5,7}$-3-acetoxy-bisnorcholadienate was obtained; M.P. 145–150° C.; (The melting point was not depressed by admixture with the methyl $\Delta^{5,7}$-3-acetoxy-bisnorcholadienate prepared, as described in Example 3 by the acetylation of methyl $\Delta^{5,7}$-3-hydroxy-bisnorcholadienate) $[\alpha]_D^{22°} = -88°$. Absorption spectrum:

λ max. 2700 ($E_{1\,cm.}^{1\%}$ 277); λ max. 2820 ($E_{1\,cm.}^{1\%}$ 293); λ max 2930 ($E_{1\,cm.}^{1\%}$ 167)

Anal. Calc'd for $C_{25}H_{36}O_4$: C, 74.90; H, 9.06; Found: C, 74.90; H, 9.37.

*Example 6*

Ten grams of methyl $\Delta^{5,7}$-3-benzoxy-bisnorcholadienate (prepared as described in Example 3) was dissolved in 140 cc. of chloroform, and to the solution was added a solution containing 15.3 g. of mercuric acetate dissolved in 260 cc. of acetic acid. The resulting solution was allowed to stand at room temperature (at which temperature the solution rapidly deposited mercurous acetate) for a period of about 18 hours. The mercurous acetate was then separated from the reaction mixture by filtration, and the filtered solution was evaporated to small volume. The residual crystalline material was dissolved in chloroform, and the chloroform solution was filtered and evaporated to dryness. The product thus obtained was recrystallized from methanol to give 4.7 g. of crude methyl $\Delta^{5,7,9}$-3-benzoxy-bisnorcholatrienate. This material was recrystallized from methanol and acetone to give analytically pure methyl $\Delta^{5,7,9}$-3-benzoxy-bisnorcholatrienate, which was obtained in the form of platelets containing one molecule of acetone of crystallization; M.P. 168.5–171° C.; $[\alpha]_D^{22°}$ +186°. Evidence of structure was adduced from the ultraviolet absorption spectrum;

$\lambda$ max. 3110A ($E_{1cm.}^{1\%}$ 244); $\lambda$ max. 3240A ($E_{1cm.}^{1\%}$ 279); $\lambda$ max. 3400A ($E_{1cm.}^{1\%}$ 172)

Anal. Calc'd for $C_{30}H_{36}O_4 \cdot C_3H_6O$: C, 76.41; H, 8.17; Found: C, 77.03; H, 8.16. This product was dried at 100° C. at 0.1 mm. thereby giving the solvent free methyl $\Delta^{5,7,9}$-3-benzoxy-bisnorcholatrienate. Anal. Calc'd for $C_{30}H_{36}O_4$: C, 78.23; H, 7.88; Found: C, 77.97; H, 7.99.

Example 7

To a solution containing 23.37 g. of methyl $\Delta^{5,7}$-3-benzoxy-bisnorcholadienate dissolved in 335 ml. of chloroform, was added slowly, with stirring, a solution containing 32.5 g. of mercuric acetate dissolved in 520 ml. of glacial acetic acid, while maintaining the temperature of the mixture below approximately 5° C. The resulting mixture was stirred at a temperature of approximately 0° C. for a period of about twenty-four hours and was then filtered. The filtered solution was shaken with 1500 ml. of water, and the layers were separated. The aqueous layer was extracted with two 75 ml. portions of chloroform, and the combined chloroform extracts were washed with water, and dried over sodium sulfate. The chloroform was evaporated in vacuo from the dry chloroform solution, and the crystalline product thus obtained was washed thoroughly with methanol to give 17.0 g. of methyl $\Delta^{5,7,9}$-3-benzoxy-bisnorcholatrienate; M.P. 167–172° C.

Example 8

To a solution containing 6.62 g. of methyl $\Delta^{5,7}$-3-benzoxy-bisnorcholadienate dissolved in 750 ml. of absolute ethanol, was added a solution of 10.1 g. of mercuric acetate dissolved in 100 ml. of absolute ethanol containing 3 ml. of glacial acetic acid. The mixture was heated under reflux for a period of approximately one hour. The reaction solution was filtered while hot, and the filtrate was evaporated in vacuo almost to dryness. The residual material was extracted with chloroform and the chloroform solution filtered. The filtered chloroform extract was evaporated to a volume of approximately 15 ml., and 100 ml. of methanol was added to the concentrated chloroform solution. The crystalline material which separated was recovered by filtration and dried to give 4.71 g. of crude methyl $\Delta^{5,7,9}$-3-benzoxy-bisnorcholatrienate; M.P. 163–175° C. Evaporation of the mother liquor gave 0.21 g. of material melting at 164–172° C. The two crops (4.92 g.) were combined and recrystallized from chloroform methanol to give material melting at 173–179° C.; the absorption spectrum indicated that this material was a mixture of methyl $\Delta^{5,7,9}$-3-benzoxy-bisnorcholatrienate and unchanged methyl $\Delta^{5,7}$-3-benzoxy-bisnorcholadienate.

Example 9

8.30 grams of methyl $\Delta^{5,7}$-3-hydroxy-bisnorcholadienate was dissolved in 140 ml. of chloroform, and to this solution was added slowly, with stirring, a solution of 17.3 g. of mercuric acetate in 265 ml. of glacial acetic acid, while maintaining the temperature of the mixture below approximately 3° C. The mixture was stirred at a temperature of 0° C. for approximately fifteen hours, and was then stirred at room temperature (25° C.) for an additional period of about one and one-half hours. The mercurous acetate which precipitated during the reaction was removed by filtration, and the filtered solution was shaken with 600 ml. of water. The aqueous layer was extracted with chloroform and the combined chloroform extracts were washed with water, dried over anhydrous sodium sulfate, and evaporated to dryness in vacuo. The residual material was digested with 30 ml. of absolute ethanol, and the resulting slurry was cooled to aproximately 0° C. The insoluble material was recovered by filtration and washed with absolute ethanol to give 4.20 g. of crude methyl $\Delta^{5,7,9}$-3-hydroxy-bisnorcholatrienate; M.P. 197–203° C.

This material was recrystallized repeatedly from absolute ethanol to give substantially pure methyl $\Delta^{5,7,9}$-3-hydroxy-bisnorcholatrienate; M.P. 204–206.5° C.; $[\alpha]_D^{22°}$ = +159°±2; absorption spectrum;

$\lambda$ max. 3120A ($E_{1cm.}^{1\%}$ 265); $\lambda$ max. 3240A ($E_{1cm.}^{1\%}$ 300); $\lambda$ max. 3380A ($E_{1cm.}^{1\%}$ 187)

Example 10

250 milligrams of methyl $\Delta^{5,7,9}$-3-benzoxy-bisnorcholatrienate, prepared as described in Example 7 hereinabove, was heated under reflux for a period of 45 minutes with 25 ml. of a 1% solution of potassium hydroxide in methanol. The reaction mixture was evaporated in vacuo to a small volume, and the residual material was mixed with 25 ml. of water and the resulting mixture was extracted thoroughly with chloroform. The chloroform extracts were dried, the chloroform evaporated therefrom, and the residual material was recrystallized from ethanol to give substantially pure methyl $\Delta^{5,7,9}$-3-hydroxy-bisnorcholatrienate; M.P. 203.5° C.; no depression in melting point occurred when this material was admixed with pure methyl $\Delta^{5,7,9}$-3-hydroxy-bisnorcholatrienate prepared as described in Example 9 hereinabove.

Example 11

Five grams of methyl $\Delta^{5,7,9}$-3-hydroxy-bisnorcholatrienate were dissolved in 50 ml. of dry pyridine, and 3.3 ml. of acetic anhydride were added to the resulting solution. The mixture was allowed to stand overnight at substantially room temperature, and was then poured into 200 ml. of ice water. The material which precipitated was recovered by filtration, and dried to constant weight in vacuo to give 5.48 g. of methyl $\Delta^{5,7,9}$-3-acetoxy-bisnorcholatrienate; M.P. 122–124° C. This material was further purified by recrystallization from methanol and then from ethanol, to give substantially pure methyl $\Delta^{5,7,9}$-3-acetoxy-bisnorcholatrienate; M.P. 125–126.5° C.

Example 12

31.6 grams of $\Delta^5$-3-hydroxy-20-keto-pregnene was suspended in 700 cc. of benzene, and the resulting suspension was dried by distilling 200 cc. of benzene therefrom. 9.3 grams of pyridine was added to the dry suspension, and 15 g. of benzoylchloride was added to the resulting mixture, with stirring, over a thirty-minute period. The reaction mixture was stirred for an additional period of approximately fifteen hours, and the precipitated material was then recovered by filtration and held separately. The filtered solution was washed with two 200 cc. portions of water, two 200 cc. portions of 1.25 N aqueous hydrochloric acid solution, one 100 cc. portion of water, one 200 cc. portion of saturated aqueous sodium bicarbonate solution, and finally with one 100 cc. portion of water. The washed benzene extract was dried over anhydrous sodium sulfate, and was then evaporated to small volume. The crystalline material which separated was recovered by filtration and purified by recrystallization from acetone.

The initial solid material obtained by filtration of the reaction mixture, was likewise purified by recrystallization from acetone, and the two fractions were combined to give approximately 27.2 g. of substantially pure $\Delta^5$-3- benzoxy-20-keto-pregnene; M.P. 194–195° C.; yield approximately 65% of theory; $[\alpha]_D^{23°}=+36°$ (C=0.98 in chloroform); Anal. Calc'd for $C_{28}H_{36}O_3$: C, 79.90; H, 8.62; Found: C, 80.19; H, 8.58.

*Example 13*

4.2 grams of $\Delta^5$-3-benzoxy-20-keto-pregnene were dissolved in 80 cc. of carbon tetrachloride, 2.26 g. of N-bromosuccinimide was added to the solution, and the resulting mixture was heated under reflux for a period of eight minutes while illuminating the mixture with a photoflood light. At the end of this eight-minute period, the reaction mixture was cooled, 1 g. of dimethylaniline was added, and the resulting mixture was filtered. The filtrate was evaporated to dryness, and the residual material was purified by recrystallization from acetone to give substantially pure $\Delta^5$-3-benzoxy-7-bromo-20-keto-pregnene; M.P. 141–142° C.; $[\alpha]_D^{23°}=-143°$ (C=0.6 in chloroform). Anal. Calc'd for $C_{28}H_{35}O_3Br$: Br, 16.36; Found: Br, 16.63.

*Example 14*

A mixture of 200 mg. of $\Delta^5$-3-benzoxy-7-bromo-20-keto-pregnene, 15 cc. of xylene and 2 cc. of dimethylaniline was heated under reflux for a period of approximately one hour. The reaction mixture was decanted from tarry material and diluted with 50 cc. of benzene. The solvents and dimethylaniline were removed from this solution by evaporation in vacuo, and the residual crystalline material was purified by recrystallization from acetone to give substantially pure $\Delta^{5,7}$-3-benzoxy-20-keto-pregnadiene; M.P. 208–209° C.; $[\alpha]_D^{23°}=-39°$ (C=0.74 in chloroform). Anal. Calc'd for $C_{28}H_{34}O_3$: C, 80.34; H, 8.19; Found: C, 79.91; H, 7.7.

In accordance with its structure, the compound possessed absorption maxima at 2280, 2720, 2820 and 2945A, with Em. values of 15,000, 12,240, 12,800 and 7,400 respectively.

*Example 15*

Thirty grams of $\Delta^5$-3-hydroxy-20-keto-pregnene was dissolved in 100 cc. of acetic anhydride, and the resulting solution was heated under reflux for a period of approximately three and one-half hours. The reaction mixture was cooled, and the crystalline material which separated was recovered by filtration, and washed free of acetic anhydride with methanol to give substantially pure $\Delta^5$-3-acetoxy-20-keto-pregnene; M.P. 147–148° C.; $[\alpha]_D^{22°}=+8°$ (C=1.01 in chloroform).

*Example 16*

3.6 grams of $\Delta^5$-3-acetoxy-20-keto-pregnene was dissolved in carbon tetrachloride, 1.87 g. of N-bromosuccinimide was added, and the resulting mixture was heated under reflux for a period of approximately 20 minutes while illuminating the mixture with a photo-flood light. At the end of this period, the photochemical reaction was interrupted, the reaction solution was cooled, and the cold solution was filtered to remove insoluble succinimide. The filtered solution was then evaporated in vacuo, and methanol was added to the residual material whereupon the latter crystallized and was purified by recrystallization from methanol to give substantially pure $\Delta^5$-3-acetoxy-7-bromo-20-keto-pregnene; M.P. 121–122° C.; $[\alpha]_D^{23°}=-228°$ (C=1.25 in chloroform). Anal. Calc'd for $C_{23}H_{33}O_3Br$: C, 63.15; H, 7.6; Br, 18.26; Found: C, 63.48; H, 7.99; Br, 18.38.

*Example 17*

1.7 grams of $\Delta^5$-3-acetoxy-7-bromo-20-keto-pregnene was mixed with 10 g. of dimethylaniline, and the mixture was heated on the steam bath for a period of approximately two hours. The reaction mixture was diluted with 100 cc. of benzine and 50 cc. of benzene, and the resulting solution was washed successively with one 100 cc. portion of 1N sulfuric acid, two 75 cc. portions of water, one 75 cc. portion of saturated aqueous sodium bicarbonate solution, and finally with one 75 cc. portion of water. The washed organic layer was then dried and the dried solution was evaporated in vacuo to give a crude $\Delta^{5,7}$-3-acetoxy-20-keto-pregnadiene, which was obtained in the form of an oil.

*Example 18*

The crude $\Delta^{5,7}$-3-acetoxy-20-keto-pregnadiene, prepared as described in Example 17 hereinabove, was dissolved in 50 cc. of methanol containing 1 g. of potassium hydroxide, and the resulting solution was heated under reflux. The resulting mixture was evaporated in vacuo to a small volume and the residual material was diluted with water, and the aqueous mixture was extracted thoroughly with chloroform. The chloroform extract was then filtered and dried, and the chloroform evaporated therefrom to give crude $\Delta^{5,7}$-3-hydroxy-20-keto-pregnadiene. This material was purified by recrystallization from ethanol to give substantially pure $\Delta^{5,7}$-3-hydroxy-20-keto-pregnadiene; M.P. 204–211° C. Anal. Calc'd for $C_{21}H_{30}O_2$: C, 80.21; H, 9.62; Found: C, 79.95; H, 9.32. The $\Delta^{5,7}$-3-hydroxy-20-keto-pregnadiene possessed an absorption spectrum in accord with its structure; $\lambda$ max. 2400, 2724; 2820 and 2940 with Em. values respectively 3480, 9300, 9950 and 6220.

The identical compound was obtained by hydrolysis of $\Delta^{5,7}$-3-benzoxy-20-keto-pregnadiene prepared as described in Example 14 hereinabove.

*Example 19*

A solution containing 5.93 g. of $\Delta^{5,7}$-3-benzoxy-20-keto-pregnadiene dissolved in 85 ml. of chloroform was added to a solution of 10 g. of mercuric acetate dissolved in 155 ml. of glacial acetic acid. The resulting mixture was stirred at room temperature for a period of 40 hours, at the end of which time the mercuric acetate, which precipitated, was separated from the reaction mixture by filtration. The filtered solution was evaporated to dryness at room temperature under a nitrogen atmosphere, and the residual material was extracted with ether. The ether extract was evaporated at room temperature in a stream of nitrogen. The product thus obtained was dissolved in 100 ml. of glacial acetic acid containing 25 ml. of chloroform, and the resulting solution was stirred with a small amount of zinc dust for a period of two hours. The zinc dust was removed by filtration, and the filtrate was evaporated to dryness in vacuo under a nitrogen atmosphere. The residual material was purified by crystallization from methanol and dried to give substantially pure $\Delta^{5,7,9}$-3-benzoxy-20-keto-pregnatriene containing one molecule of methanol of crystallization, which was not removed by drying the compound at a temperature of 103° C. at a pressure of 0.1 mm., M.P. 196–199° C. Anal Calc'd for $C_{28}H_{32}O_3 \cdot CH_3OH$: C, 77.64; H, 8.09; Found: C, 77.75; H, 8.15. Optical rotation $[\alpha]_D^{25°}=+169°$.

*Example 20*

Three hundred milligrams of $\Delta^{5,7}$-3-hydroxy-20-keto-pregnadiene was dissolved in 25 ml. of chloroform, and to this solution was added a solution containing 610 mg. of mercuric acetate dissolved in 50 ml. of glacial acetic acid. The resulting mixture was stirred at room temperature for a period of about 24 hours, and was then allowed to stand without stirring for an additional 15 hour period. The mercurous acetate which precipitated was separated by filtration and the filtered solution was evaporated in vacuo under a nitrogen atmosphere. The residual material was dissolved in chloroform and 50 ml. of anhydrous ether was added to the solution. The resulting mixture was filtered, and the filtrate was evaporated in vacuo under a nitrogen atmosphere. The residual material was purified by recrystallization from methanol to give substantially pure $\Delta^{5,7,9}$-3-hydroxy-20-keto-pregnatriene; M.P. 189–193° C.

Example 21

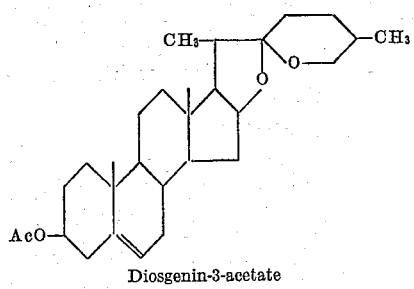
Diosgenin-3-acetate

N-bromosuccinimide →

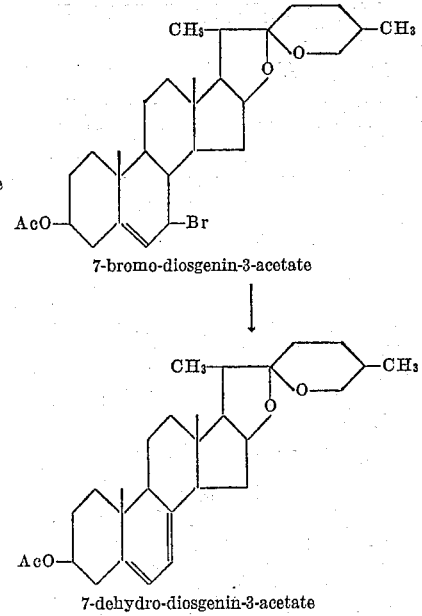
7-bromo-diosgenin-3-acetate

↓

7-dehydro-diosgenin-3-acetate

A solution containing 4.57 g. (0.01 mole) of diosgenin-3-acetate dissolved in 100 ml. of carbon tetrachloride was distilled until 200 cc. of the distillate had been collected. The solution was allowed to cool slightly, and 1.96 g. (0.011 mole) of N-bromosuccinimide was added to the solution. The resulting mixture was illuminated with a photoflood lamp (No. RFL-2 manufactured by General Electric Co.) for a period of six minutes, during which time the reaction mixture boiled vigorously, the volatile components being returned to the reaction mixture as reflux. The reaction mixture was then cooled, and the insoluble material was removed therefrom by filtration. The filtered solution was evaporated in vacuo until a greenish, viscous oil remained. Upon the addition of petroleum ether (B.P. 30–60° C.) crystallization of the oil occurred. The crystalline material was slurried with petroleum ether, filtered, and washed with petroleum ether to give 3.25 g. of 7-bromo-diosgenin-3-acetate; M.P. 143–145° C., dec. This material was further purified by recrystallization from acetone to give small needles; M.P. 151–154° C., dec; $[\alpha]_D^{24} = -250°$ (in chloroform).

A mixture of 25 ml. of xylene and 3 ml. of 2,4,6-collidine was heated to boiling, and to the hot solution was added, in small portions two grams of 7-bromo-diosgenin-3-acetate. The resulting mixture was heated under reflux for an additional fifteen-minute period. The reaction mixture was then cooled, washed successively with water and with cold 1N aqueous hydrochloric acid and with 5% sodium bicarbonate solution. The organic layer was then dried over anhydrous sodium sulfate and the xylene was evaporated therefrom in vacuo to give a crystalline residue. The residual material was recrystallized from acetone to give 0.83 g. of crude 7-dehydro-diosgenin-3-acetate which was obtained in the form of needles; M.P. 175–188° C. The absorption spectrum of this material indicated that it was a mixture of $\Delta^{5,7}$- and $\Delta^{4,6}$-diene isomers.

| λ Max. | $E_{1\ cm.}^{1\%}$ |
|---|---|
| 2320 A. | 157 |
| 2390 | 174 |
| 2480 | 140 |
| 2620–40 | [1] 119 |
| 2710 | 167 |
| 2820 | 176 |
| 2930 | 102 |

[1] Shoulder.

This mixture was recrystallized twice from methanol to give elongated flat plates of the $\Delta^{5,7}$-diene isomer in substantially pure form; M.P. 195–203° C.; $[\alpha]_D^{24} = -132°$. The absorption spectrum has the characteristics of a $\Delta^{5,7}$-diene system.

| λ Max. | $E_{1\ cm.}^{1\%}$ |
|---|---|
| 2620 | [1] 162 |
| 2710 | 229 |
| 2820 | 240 |
| 2930 | 137 |

[1] Shoulder.

Various changes and modifications may be made in carrying out the present invention without departing from the spirit and scope thereof. Insofar as these changes and modifications are within the purview of the annexed claims, they are to be considered as part of our invention.

We claim:
1. Lower alkyl $\Delta^5$-3-acyloxy-7-bromo-bisnorcholenates wherein the 3-acyloxy substituent is derived from a lower hydrocarbon carboxylic acid.
2. Methyl $\Delta^5$-3-benzoxy-7-bromo-bisnorcholenate.
3. Methyl $\Delta^5$-3-acetoxyl-7-bromo-bisnorcholenate.

References Cited in the file of this patent

UNITED STATES PATENTS

| | | |
|---|---|---|
| 2,533,124 | Levin | Dec. 5, 1950 |
| 2,566,342 | Levin | Sept. 4, 1951 |
| 2,588,396 | Levin | Mar. 11, 1952 |
| 2,858,307 | Rosenkranz | Oct. 28, 1958 |
| 2,876,237 | Julian | Mar. 3, 1959 |